United States Patent
Ji et al.

(10) Patent No.: US 11,314,956 B2
(45) Date of Patent: *Apr. 26, 2022

(54) BARCODE-READING SYSTEM THAT AUTOMATICALLY ADJUSTS CERTAIN OUTPUTS BASED ON AMBIENT CHARACTERISTICS

(71) Applicant: The Code Corporation, Murray, UT (US)

(72) Inventors: Hong Ji, Grand Prairie, TX (US); John Deal, Springfield, PA (US)

(73) Assignee: The Code Corporation, Murray, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/908,439

(22) Filed: Jun. 22, 2020

(65) Prior Publication Data

US 2020/0320261 A1    Oct. 8, 2020

Related U.S. Application Data

(63) Continuation of application No. 16/234,322, filed on Dec. 27, 2018, now Pat. No. 10,691,906.

(60) Provisional application No. 62/611,342, filed on Dec. 28, 2017.

(51) Int. Cl.
| | | |
|---|---|---|
| G06K 7/10 | (2006.01) | |
| G08B 7/06 | (2006.01) | |
| G06K 7/14 | (2006.01) | |
| G08B 5/36 | (2006.01) | |
| H02J 7/00 | (2006.01) | |
| G08B 3/10 | (2006.01) | |

(52) U.S. Cl.
CPC ....... *G06K 7/10722* (2013.01); *G06K 7/1413* (2013.01); *G08B 3/10* (2013.01); *G08B 5/36* (2013.01); *G08B 7/06* (2013.01); *H02J 7/0044* (2013.01); *H02J 7/0047* (2013.01)

(58) Field of Classification Search
None
See application file for complete search history.

(56) References Cited

U.S. PATENT DOCUMENTS

| | | | | |
|---|---|---|---|---|
| 7,527,207 B2 * | 5/2009 | Acosta | ............... | G06K 7/10732 235/462.17 |
| 8,500,023 B2 * | 8/2013 | Zolotov | ............. | G06K 7/10722 235/462.04 |
| 10,691,906 B2 * | 6/2020 | Ji | ....................... | G06K 7/10722 |
| 2002/0070278 A1 * | 6/2002 | Hung | .................. | G06K 7/1095 235/472.01 |

\* cited by examiner

*Primary Examiner* — Kristy A Haupt
(74) *Attorney, Agent, or Firm* — Thomas M. Hardman (57) ABSTRACT

A barcode-reading system may include a barcode reader and at least one detector that is configured to detect a characteristic of an environment in which the barcode-reading system is located. The barcode-reading system may also include a controller that is configured to adjust at least one output of the barcode-reading system based on at least one detected characteristic.

20 Claims, 5 Drawing Sheets

| Ambient Illumination | Brightness of Indicator Lights |
|---|---|
| Level 1 | $PWM_1$ |
| Level 2 | $PWM_2$ |
| ⋮ | ⋮ |
| Level N | $PWM_N$ |

| Ambient Illumination | Brightness of Red Indicator Light | Brightness of Yellow Indicator Light | Brightness of Green Indicator Light |
|---|---|---|---|
| Level 1 | $PWM_{1R}$ | $PWM_{1Y}$ | $PWM_{1G}$ |
| Level 2 | $PWM_{2R}$ | $PWM_{2Y}$ | $PWM_{2G}$ |
| ⋮ | ⋮ | ⋮ | ⋮ |
| Level N | $PWM_{NR}$ | $PWM_{NY}$ | $PWM_{NG}$ |

BARCODE-READING SYSTEM THAT AUTOMATICALLY ADJUSTS CERTAIN OUTPUTS BASED ON AMBIENT CHARACTERISTICS

CLAIM OF PRIORITY

This application is a continuation of U.S. patent application Ser. No. 16/234,322 ("the '322 Application"), filed Dec. 27, 2018, titled "BARCODE-READING SYSTEM THAT AUTOMATICALLY ADJUSTS CERTAIN OUTPUTS BASED ON AMBIENT CHARACTERISTICS," with inventors Hong Ji and John Deal. The '322 Application claims the benefit of U.S. Provisional Patent Application No. 62/611,342, filed Dec. 28, 2017, titled "AUTOMATICALLY ADJUSTING BRIGHTNESS OF INDICATOR LIGHTS IN A CHARGING CRADLE OR BARCODE READER BASED ON AMBIENT ILLUMINATION," with inventors Hong Ji and John Deal. The foregoing applications are incorporated herein by reference in their entirety.

BACKGROUND

A barcode is an optical machine-readable representation of information. Devices for identifying or extracting information from barcodes are generally referred to as barcode readers (or barcode scanners). Barcodes and barcode readers have become widely used in many different types of environments, such as hospitals, point-of-sale stations in retail stores and supermarkets, inventory and document tracking, and the like.

Barcode readers may be powered by a rechargeable battery. The manufacturer of a barcode reader typically provides a holder for the reader, which is commonly referred to as a charging cradle (or simply a cradle). In addition to providing a convenient place to store the barcode reader, the charging cradle may also be used to charge the reader's rechargeable battery.

A barcode-reading system that includes a barcode reader and its charging cradle may produce various outputs. Some of the outputs may convey relevant information to users. For example, a barcode reader and/or its charging cradle may include one or more lights that indicate the charging status of the reader and possibly other information as well. As another example, a barcode reader and/or its charging cradle may be configured to play a certain type of sound (e.g., a beeping sound) in response to particular events, such as successfully reading a barcode, being placed correctly in the charging cradle, etc. As yet another example, a barcode reader may be configured to emit tactile feedback (e.g., a vibration) in response to particular events, such as successfully reading a barcode, being placed correctly in the charging cradle, etc.

In known barcode-reading systems, the characteristics of certain outputs remain fairly constant. For example, in known barcode readers, the indicator lights on the reader and/or on its charging cradle are kept at the same level of brightness at all times. Similarly, the volume of sounds that are played by a barcode reader and/or its charging cradle typically remain at the same volume level. To the extent that it possible to change the brightness level or volume level at all, such a change typically requires manual adjustment (e.g., by scanning a configuration code).

Having the characteristics of outputs remain constant can be problematic in certain situations. For example, in many hospitals, barcode readers and their corresponding charging cradles are installed inside patient rooms. The brightness of the indicator lights and/or the volume of sounds that are played may be set to levels that are useful during the day, but these same brightness and volume levels may keep patients awake at nighttime. As another example, the volume of sounds (e.g., beeping sounds) that are played by a barcode reader may be set to a standard level that is suitable for a relatively quiet environment. If, however, the barcode reader is taken to a noisy environment, the user will likely be unable to hear any sounds that are played by the barcode reader at the standard volume level.

SUMMARY

The present disclosure is generally related to a barcode-reading system that is configured to automatically adjust one or more outputs (e.g., the brightness of indicator lights, the volume of sounds played, the duration or intensity of tactile feedback) based on one or more ambient characteristics, i.e., characteristics of the environment in which the barcode-reading system is being used.

In accordance with the present disclosure, a barcode-reading system may include a barcode reader and at least one detector that is configured to detect a characteristic of an environment in which the barcode-reading system is located. The barcode-reading system may also include a controller that is configured to adjust at least one output of the barcode-reading system based on at least one detected characteristic.

Different types of detectors may be utilized in accordance with the present disclosure. For example, the barcode-reading system may include a light detector that is configured to detect the intensity of ambient illumination that is present in the environment in which the barcode-reading system is located. In some embodiments, the light detector may take the form of an image sensor, and the barcode-reading system may additionally include processing circuitry that is configured to analyze image data from the image sensor in order to detect the ambient illumination. Alternatively, the light detector may take the form of a photodiode. Another example of a detector that may be used is a sound detector that is configured to detect the volume and/or frequencies of ambient noise that are present in the environment in which the barcode-reading system is located.

There are many different types of outputs of the barcode-reading system that may be adjusted in accordance with the present disclosure. In some embodiments, the controller may be configured to adjust one or more features of one or more indicator lights that are included in the barcode-reading system based on the detected ambient illumination. For example, the controller may be configured to adjust the brightness of one or more indicator lights based on the intensity of ambient illumination that is detected. As another example, the controller may be configured to adjust the color of illumination displayed by one or more indicator lights based on the intensity of ambient illumination that is detected.

Another example of an output that may be adjusted is the volume of sound that is output by one or more speakers in the barcode-reading system. In some embodiments, the volume of sound may be adjusted based on the intensity of ambient illumination that is detected. In other embodiments, the volume of sound may be adjusted based on the volume and/or frequencies of ambient noise that are detected. In still further embodiments, the volume of sound may be adjusted based on the intensity of ambient illumination that is detected as well as the volume and/or frequencies of ambient noise that are detected.

Yet another example of an output that may be adjusted is the type of targeting illumination that is utilized. The barcode reader may include a first targeting illumination source (e.g., a light-emitting diode (LED)) and a second targeting illumination source (e.g., a laser). The controller may be configured to determine whether to activate the first targeting illumination source or the second targeting illumination source based on the intensity of ambient illumination that is detected.

Yet another example of an output that may be adjusted is the color of illumination that is emitted by an illumination source of the barcode reader. In some embodiments, the color of illumination may be adjusted based on one or more characteristics of a barcode within a field of view of the barcode reader.

A barcode-reading system in accordance with the present disclosure may include a barcode reader and a charging cradle that is configured to receive the barcode reader. In some embodiments, the controller that adjusts the outputs may be located in the barcode reader, and at least some of the outputs that are being adjusted (e.g., the indicator lights, the speaker) may be included in the charging cradle. Alternatively, both the controller and the outputs that are being adjusted may be included in the charging cradle.

DETAILED DESCRIPTION

Figure 1:
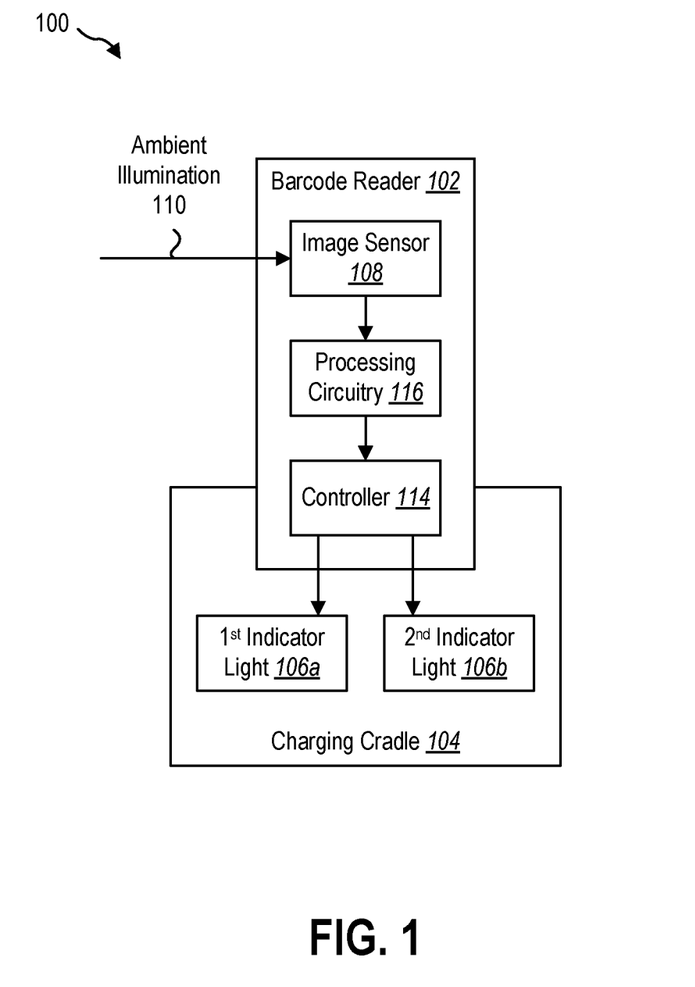
FIG. 1 illustrates a barcode-reading system in accordance with the present disclosure in which the controller is included in the barcode reader, and the outputs that are being adjusted are included in the charging cradle.

FIG. 1 illustrates an example of a barcode-reading system 100 that is configured to automatically adjust one or more outputs based on one or more ambient characteristics in accordance with the present disclosure. The system 100 includes a barcode reader 102 and a charging cradle 104 that is configured to receive the barcode reader 102. The barcode reader 102 includes a detector that is configured to detect a characteristic of an environment in which the barcode reader 102 is located. More specifically, the detector is a light detector, and the detected characteristic is ambient illumination 110.

In the depicted embodiment, the light detector is an image sensor 108. The image sensor 108 includes a two-dimensional array of light-sensitive elements, or photosensors. When the barcode reader 102 is being used to read a barcode, the image sensor 108 is used to capture a digital image of the barcode. More specifically, one or more light sources within the barcode reader 102 may be activated to illuminate a target area that includes the barcode. Optics within the barcode reader 102 focus light reflected from the target area onto the image sensor 108. Read-out circuitry electronically reads the photo sensors in order to obtain a digital image of the barcode. This digital image may then be processed in order to decode the barcode.

In accordance with the present disclosure, the image sensor 108 may also be used for the purpose of detecting the level of ambient illumination 110. The image sensor 108 may be used for this purpose even when it is not being used to capture images for barcode reading. For example, the image sensor 108 may periodically capture an image for the purpose of detecting the intensity of ambient illumination 110. When the image sensor is capturing an image that is going to be used solely for detecting ambient illumination 110, the illumination that would normally be activated if the barcode reader 102 were being used to read a barcode may not be turned on. The barcode reader 102 also includes processing circuitry 116 that is configured to analyze image data from the image sensor 108 in order to detect the intensity of ambient illumination 110 that is present.

In an alternative embodiment, a different type of light detector may be included in the barcode reader 102. For example, the barcode reader 102 may include a photodiode, either instead of or in addition to the image sensor 108. In some embodiments, the barcode reader 102 may include an image sensor 108 that may be used solely for reading barcodes, as well as a photodiode that may be used for detecting ambient illumination. In other embodiments, both the image sensor 108 and the photodiode may be used for detecting ambient illumination.

The charging cradle 104 may include a recess into which the barcode reader 102 may be inserted. The barcode reader 102 and the charging cradle 104 may be configured such that when the barcode reader 102 is positioned in the charging cradle 104, the light detector (e.g., an image sensor 108 and/or a photodiode) is not completely covered by the charging cradle 104, thereby allowing the light detector to detect the level of ambient illumination 110. For example, the light detector may be located someplace on the reader 102 that is not contained within the recess when the barcode reader 102 is inserted into the charging cradle 104. Alternatively, even if the light detector is contained within the recess when the barcode reader 102 is inserted into the charging cradle 104, the charging cradle 104 itself may include an opening that exposes the light detector to the ambient illumination 110.

The image sensor 108 may provide an indication of the level of ambient illumination 110 to a controller 114 (via processing circuitry 116). The controller 114 may be configured to adjust at least one output of the system 100 based on the intensity of ambient illumination 110 that is detected. For example, in the depicted embodiment, the controller 114 may be configured to adjust one or more features of indicator lights 106a-b that are included in the charging cradle 104 based on the intensity of ambient illumination 110 that is detected.

The indicator lights 106a-b may provide information about the charging status of the barcode reader 102. For example, the first indicator light 106a may, when activated, indicate a status of "charging." The second indicator light 106b may, when activated, indicate a status of "fully charged." The number and type of indicator lights 106a-b shown in FIG. 1 is for purposes of example only. A charging cradle 104 in accordance with the present disclosure may include a different number of indicator lights 106a-b, and the indicator lights 106a-b may provide different kinds of information.

The controller 114 may be configured to adjust the brightness of the indicator lights 106a-b based on the intensity of ambient illumination 110 that is detected. Typically, indicator lights 106a-b are relatively easy to see in a dark environment, but harder to see in a bright environment. Therefore, if a relatively low level of ambient illumination 110 is detected (e.g., if the barcode reader 102 is located in a dark environment), then the controller 114 may decrease the brightness of the indicator lights 106a-b, because the indicator lights 106a-b do not have to be as bright in order to be detected by human eyes. Conversely, if a relatively high level of ambient illumination 110 is detected (e.g., if the barcode reader 102 is located in a bright environment), then the controller 114 may increase the brightness of the indicator lights 106a-b, because it is more difficult for human eyes to see the indicator lights 106a-b in a bright environment.

This feature may be advantageous if the barcode reader 102 and charging cradle 104 are being installed in a location where people sometimes sleep. For example, if the barcode reader 102 and charging cradle 104 are being installed in a medical facility, such as a hospital, the brightness of the indicator lights 106a-b may keep patients awake at night. The techniques disclosed herein may potentially address this problem by automatically adjusting the brightness of the indicator lights 106a-b so that they do not appear too bright in relation to the intensity of ambient illumination 110 that is present.

In addition to (or instead of) adjusting the brightness of the indicator lights 106a-b, the controller 114 may be configured to adjust one or more other features of the indicator lights 106a-b based on the intensity of ambient illumination 110 that is detected. For example, the controller 114 may be configured to adjust the color of illumination displayed by the indicator lights 106a-b based on the intensity of ambient illumination 110 that is detected. This may be possible in embodiments where the indicator lights 106a-b are capable of emitting or displaying different colors of illumination.

Some colors are more noticeable to human eyes than others. In some embodiments, the controller 114 may be configured to adjust the color of illumination displayed by the indicator lights 106a-b based on this principle, in order to increase visibility in a bright environment. For example, the controller 114 may be configured so that if high levels of ambient illumination 110 are detected, the controller 114 adjusts the color of illumination displayed by the indicator lights 106a-b to include a highly noticeable color (e.g., red) that is easily detected by human eyes. Suppose that in a dark environment, the first indicator light 106a is green and the second indicator light 106b is yellow. Upon detecting a significant increase in the intensity of ambient illumination 110 that is present, the controller 114 may adjust the color of illumination displayed by the indicator lights 106a-b to include a small amount of red hue, so that the first indicator light 106a is green with a slightly red hue and the second indicator light 106b is yellow with a slightly red hue. This has the effect of increasing the visibility of the indicator lights 106a-b in the bright environment. Conversely, upon subsequently detecting a significant reduction in the intensity of ambient illumination 110 that is present, the controller 114 may adjust the color of illumination displayed by the indicator lights 106a-b to reduce (or possibly remove) the red hue that was added, so that the first indicator light 106a is a more pure green and the second indicator light 106b is a more pure yellow.

In some embodiments, the controller 114 may be configured to both (i) adjust the brightness of the indicator lights 106a-b, and also (ii) adjust the color of illumination displayed by the indicator lights 106a-b based on the intensity of ambient illumination 110 that is detected. For example, as mentioned above, the controller 114 may decrease the brightness of the indicator lights 106a-b if low levels of ambient illumination 110 are detected (e.g., if the barcode reader 102 is located in a dark environment). To at least partially compensate for the reduction in visibility that occurs from decreasing the brightness of the indicator lights 106a-b, the controller 114 may adjust the color of illumination displayed by the indicator lights 106a-b to include a small amount of red hue.

Although a single controller 114 is shown in FIG. 1, the functionality performed by the controller 114 could alternatively be distributed across multiple controllers 114. These controllers 114 could be located within the barcode reader 102, within the charging cradle 104, or within both the barcode reader 102 and the charging cradle 104.

Also, in the embodiment shown in FIG. 1, the charging cradle 104 includes indicator lights 106a-b, but the reader 102 does not. In an alternative embodiment, both the reader 102 and the charging cradle 104 could include indicator lights. The brightness of both sets of indicator lights could be adjusted based on the level of ambient illumination 110 detected by the image sensor 108 (or other type of light detector).

Figure 2:
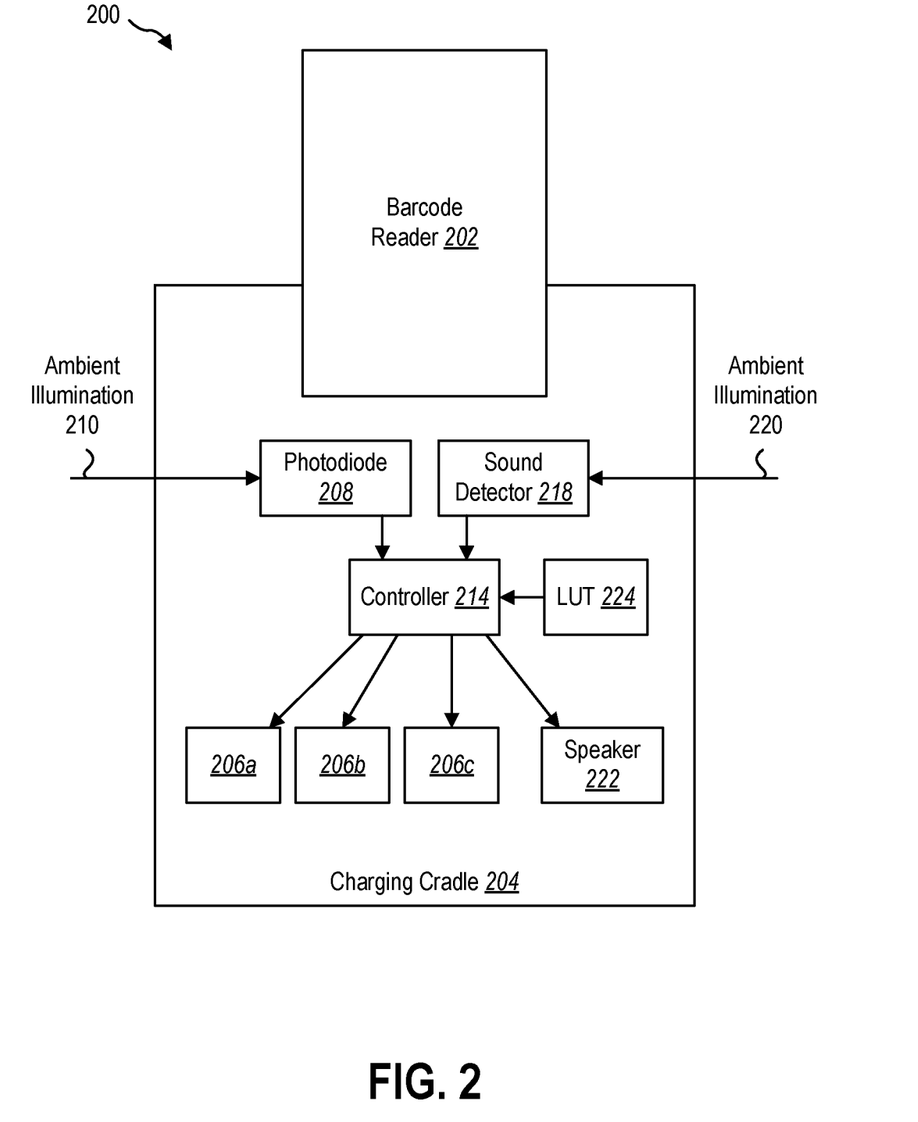
FIG. 2 illustrates a barcode-reading system in accordance with the present disclosure in which both the controller and the outputs that are being adjusted are included in the charging cradle.

FIG. 2 illustrates another example of a barcode-reading system 200 in accordance with the present disclosure. Like the system 100 described previously, the system 200 shown in FIG. 2 includes a barcode reader 202 and a charging cradle 204 that is configured to receive the barcode reader 202.

In the embodiment shown in FIG. 1, the barcode reader 102 provides signals to the charging cradle 104 to control how the charging cradle 104 adjusts the indicator lights 106a-b on the charging cradle 104. In contrast, in the embodiment shown in FIG. 2, the charging cradle 204 itself is able to determine how to adjust the indicator lights 206a-c without input from the barcode reader 202. In addition, the charging cradle 204 is able to adjust other outputs, such as the volume of sounds that are played by a speaker 222.

The charging cradle 204 includes two detectors. Both detectors are configured to detect a characteristic of an environment in which the charging cradle 204 is located. Like the system 100 shown in FIG. 1, the system 200 shown in FIG. 2 includes a light detector. However, instead of being included in the barcode reader 202 (as it is in the system 100 shown in FIG. 1), the light detector is included in the charging cradle 204. The light detector takes the form of a photodiode 208, which is configured to detect the intensity of ambient illumination 210 that is present in an environment in which the charging cradle 204 is located. In addition to the light detector (i.e., the photodiode 208), the charging cradle 204 also includes a sound detector 218. The sound detector 218 is configured to detect the volume and/or frequencies of ambient noise 220 that are present in an environment in which the charging cradle 204 is located.

Like the system 100 shown in FIG. 1, the system 200 shown in FIG. 2 includes a controller 214 that is configured to adjust at least one output of the system 200 based on one or more characteristics of the surrounding environment that are detected. However, instead of being included in the barcode reader 202 (like the controller 114 in the system 100 shown in FIG. 1), the controller 214 is included in the charging cradle 204.

Like the controller 114 in the system 100 shown in FIG. 1, the controller 214 may be configured to adjust one or more features of indicator lights 206a-c that are included in the charging cradle 204 based on the intensity of ambient illumination 210 that is detected. This may include adjusting the brightness of the indicator lights 206a-c and/or adjusting the color of illumination displayed by the indicator lights 206a-c, as discussed above.

The controller 214 may also be configured to adjust the volume of sound that is output by a speaker 222 within the charging cradle 204 based on the intensity of ambient illumination 210 that is detected. As with adjusting the brightness of the indicator lights 206a-c, this feature may be advantageous if the barcode reader 202 and charging cradle 204 are being installed in a location where people sometimes sleep. If a relatively low level of ambient illumination 210 is detected, this may indicate that it is nighttime and, as a result, reasonably likely that people would be sleeping. Consequently, the volume of sound that is output by the speaker 222 may be decreased or even turned completely off, in order to minimize the likelihood of waking anybody up. Conversely, if a relatively high level of ambient illumination 210 is detected, this may indicate that it is daytime and, as a result, reasonably unlikely that people would be sleeping. Consequently, the volume of sound that is output by the speaker 222 may be increased to a point that would be considered reasonable for normal daytime activities.

The controller 214 may also be configured to adjust the volume of sound that is output by the speaker 222 based on the volume and/or frequencies of ambient noise 220 that are detected. This feature may be advantageous if the barcode reader 202 and charging cradle 204 are at least sometimes used in a noisy environment. If a relatively high level of ambient noise 220 is detected (e.g., if the barcode reader 202 is located in a relatively noisy environment), then the controller 114 may increase the volume of sound that is output by the speaker 222 in order to increase the likelihood that the sound will be heard properly over the ambient noise 220. If, however, a relatively low level of ambient noise 220 is detected (e.g., if the barcode reader 202 is located in a relatively quiet environment), then the controller 114 may decrease the volume of sound that is output by the speaker 222, because the sound does not have to be as loud in order to be heard properly.

Similarly, in a noisy environment the controller 114 may automatically provide for tactile feedback (e.g. vibration) in response to certain events in conjunction with (or in replacement of) activating indicator lights or sounds. In a quiet environment tactile feedback may automatically replace loud sounds or, tactile feedback itself may be turned off in the event the tactile feedback is also audible.

The controller 214 may access a lookup table 224 in order to determine how to adjust the outputs of the system 200 (e.g., the brightness of the indicator lights 206a-c, the color of illumination displayed by the indicator lights 206a-c, the volume of sound that is output by the speaker 222) based on one or more characteristics of the surrounding environment (e.g., the intensity of ambient illumination 210, the volume and/or frequencies of ambient noise 220) that are detected.

Figure 2A:
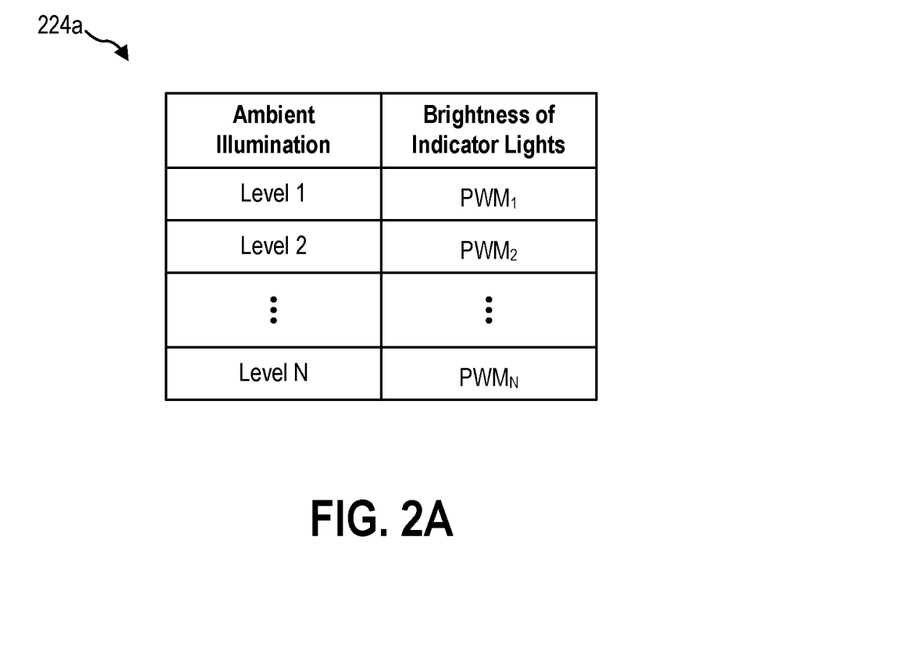
FIG. 2A illustrates an example of a lookup table in which the brightness settings are the same for different indicator lights.

FIG. 2A illustrates an example of a lookup table 224a that may be used to determine the brightness of the indicator lights 206a-c based on the intensity of ambient illumination 210 that is detected. In the embodiment shown in FIG. 2A, for a given level of ambient illumination 210, there is a single brightness setting for all of the indicator lights 206a-c.

In embodiments where the indicator lights 206a-c are LEDs, the brightness setting may be a pulse-width modulation (PWM) duty cycle. Thus, the lookup table 224a includes a first PWM duty cycle ($PWM_1$) for a first level of ambient illumination 210, a second PWM duty cycle ($PWM_2$) for a second level of ambient illumination 210, and so forth, up to an Nth PWM duty cycle ($PWM_N$) for an Nth level of ambient illumination 210.

As discussed above, the controller 214 may be configured to increase the brightness of the indicator lights 206a-c as the intensity of ambient illumination 210 increases. Therefore, assuming that the second level of ambient illumination exceeds the first level of ambient illumination, then $PWM_2 > PWM_1$, because a longer pulse-width modulation duty cycle corresponds to a greater degree of brightness. Similarly, if the Nth level of ambient illumination exceeds the second level of ambient illumination, then $PWM_N > PWM_2$.

A similar lookup table may be created for the volume level of the sounds played by the speaker 222. In such a lookup table, multiple levels of ambient noise 220 (or ambient illumination 210) may be provided. For a given level of ambient noise 220 (or ambient illumination 210), a volume setting may be provided for sounds played by the speaker 222.

Figure 2B:
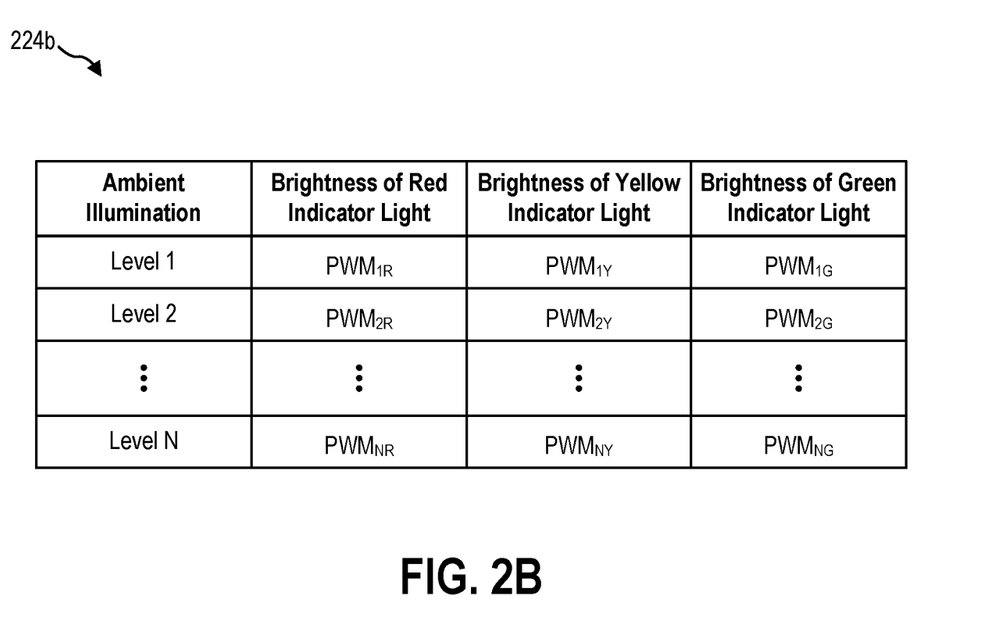
FIG. 2B illustrates an example of a lookup table in which the brightness settings are different for different indicator lights.

FIG. 2B illustrates another example of a lookup table 224b that may be used to determine the brightness of the indicator lights 206a-c based on the intensity of ambient illumination 210 that is detected. In the embodiment shown in FIG. 2B, the brightness settings are different for different indicator lights 206a-c.

In some embodiments, at least two of the indicator lights 206a-c may be different colors. Several different colors of indicator lights 206a-c may be used. Examples of different colors that may be used include red, yellow, green, and blue. Although the charging cradle 204 shown in FIG. 2 includes three indicator lights 206a-c, in alternative embodiments the charging cradle 204 (and/or the barcode reader 202) may include a different number of indicator lights 206a-c.

Because human eyes are more sensitive to certain colors of light than others, in some embodiments, some of the indicator lights 206a-c may have a different level of brightness than others for the same level of ambient illumination 210. In other words, the brightness of the indicator lights 206a-c may be a function of both the level of ambient illumination 210, and also the color of the indicator lights 206a-c.

The lookup table 224b may be structured so that the brightness settings for different colors of indicator lights 206a-c are different. For example, for a given level of ambient illumination 210, the brightness setting for the first indicator light 206a may be different than the brightness setting for the second indicator light 206b, which may be different than the brightness setting for the third indicator light 206c.

For example, consider an embodiment in which the color of the first indicator light 206a is red, the color of the second indicator light 206b is yellow, and the color of the third indicator light 206c is green. Human eyes are more sensitive to green light than to yellow light or red light. Thus, for a certain level of ambient illumination 210, the green indicator light 206c may be dimmer than the red indicator light 206a or the yellow indicator light 206b. For example, referring to the second level of ambient illumination that is shown in the lookup table 224b, the PWM duty cycle for the green indicator light 206c ($PWM_{2G}$) may be shorter than the PWM duty cycle for the red indicator light 206a ($PWM_{2R}$) or the PWM duty cycle for the yellow indicator light 206b ($PWM_{2y}$).

As an example in operation, when a barcode reader 202 with a depleted battery is inserted into a charging cradle 204, in response to either sensing that the barcode reader 202 is drawing charging current from the charging cradle 204 or in response to the barcode reader 202 providing a signal to the controller 214 that it is charging, the controller 214 may illuminate a red or yellow indicator light to indicate charging. More specifically, the controller 214 may calculate or look up a brightness level associated with the color of the indicator light and the intensity of ambient illumination 210 that has been detected, and the controller 214 may then drive illumination of the indicator light at that brightness level.

Subsequently, when the battery is charged, the controller 214 may turn off the red or yellow indicator light and illuminate a green indicator light to indicate that the barcode reader 202 is fully charged. More specifically, in response to sensing that the reader is no longer drawing charging current or in response to receiving a signal indicating that the barcode reader 202 is fully charged, the controller 214 may turn off the red or yellow indicator light (which was being driven at a brightness corresponding to the then-current ambient illumination 210 and the color of the indicator light) and turn on the green indicator light with a different brightness level than the brightness level of the red or yellow indicator light that was just turned off.

In both of the barcode-reading systems 100, 200 shown in FIGS. 1 and 2, a controller adjusts one or more outputs of a charging cradle 104, 204 (e.g., the brightness of the indicator lights 106a-b, 206a-c, the color of illumination displayed by the indicator lights 106a-b, 206a-c, the volume of sound that is output by the speaker 222) based on ambient characteristics. In some embodiments, however, one or more outputs of the barcode reader itself may be adjusted based on ambient characteristics.

Figure 3:
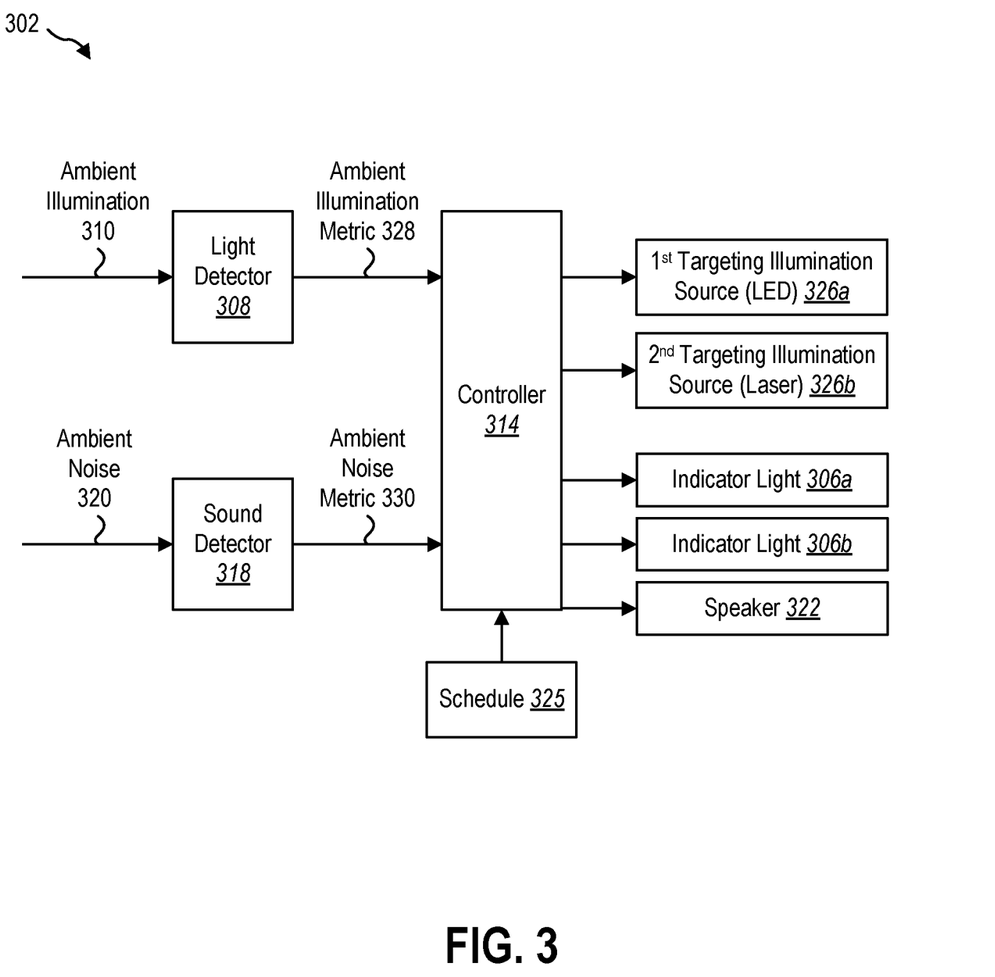
FIG. 3 illustrates a barcode reader that is configured to adjust one or more of its outputs based on ambient characteristics.

FIG. 3 illustrates an example of a barcode reader 302 that is configured to adjust one or more of its outputs based on ambient characteristics in accordance with the present disclosure. The barcode reader 302 includes two detectors. Both detectors are configured to detect a characteristic of an environment in which the barcode reader 302 is located. In particular, the barcode reader 302 includes a light detector 308 that is configured to detect the intensity of ambient illumination 310 that is present in an environment in which the barcode reader 302 is located. The light detector 308 may take the form of an image sensor, such as the image sensor 108 in the barcode reader 102 shown in FIG. 1. Alternatively, the light detector 308 may take the form of a photodiode, such as the photodiode 208 in the charging cradle 204 shown in FIG. 1. The barcode reader 302 also includes a sound detector 318 that is configured to detect the volume and/or frequencies of ambient noise 320 that are present in an environment in which the barcode reader 302 is located.

The light detector 308 and the sound detector 318 may be configured to periodically detect the ambient illumination 310 and the ambient noise 320, respectively. The light detector 308 and the sound detector 318 may be configured to detect the ambient illumination 310 and the ambient noise 320, respectively, in response to receiving a signal from the controller 314. The controller 314 may be configured to periodically send such a signal to the light detector 308 and/or the sound detector 318.

The light detector 308 may output an ambient illumination metric 328 that is representative of the intensity of ambient illumination 310 that is detected by the light detector 308. Similarly, the sound detector 318 may output an ambient noise metric 330 that is representative of the volume and/or frequencies of ambient noise 320 that are detected by the sound detector 318.

The controller 314 may also be configured to adjust at least one output of the barcode reader 302 based on one or more characteristics of the surrounding environment that are detected. For example, the controller 314 may be configured to adjust one or more features of indicator lights 306a-b that are included in the barcode reader 302 based on the intensity of ambient illumination 310 that is detected (as indicated by the ambient illumination metric 328). This may include adjusting the brightness of the indicator lights 306a-b and/or adjusting the color of illumination displayed by the indicator lights 306a-b, as discussed above. The controller 314 may also be configured to adjust the volume of sound that is output by a speaker 322 within the barcode reader 302 based on the intensity of ambient illumination 310 that is detected by the light detector 308 and/or the volume and/or frequencies of ambient noise 320 that are detected by the sound detector 318 (as indicated by the ambient noise metric 330).

Another type of output that may be adjusted based on ambient characteristics is the type of targeting illumination source that is being used. The barcode reader 302 includes different targeting illumination sources, namely a first targeting illumination source 326a and a second targeting illumination source 326b. In some embodiments, the first targeting illumination source 326a may be a light-emitting diode (LED), and the second targeting illumination source 326b may be a laser. The targeting pattern that is displayed by a laser is typically much brighter and easier to see than the targeting pattern that is displayed by an LED. Because of safety concerns associated with the use of a lasers, however, it is typically preferable to use an LED to generate a targeting pattern unless the barcode reader 302 is being used in circumstances in which the LED targeting pattern is difficult to see.

In accordance with the present disclosure, the controller 314 may be configured to determine whether to activate the first targeting illumination source 326a or the second targeting illumination source 326b based on the intensity of ambient illumination 310 that is detected. For example, assuming that the first targeting illumination source 326a is an LED and that the second targeting illumination source 326b is a laser, the controller 314 may be configured to select the LED targeting source 326a as long as the intensity of ambient illumination 310 (as indicated by the ambient illumination metric 328) remains below a threshold value. In other words, the LED targeting source 326a may be selected as long as the environment in which the barcode reader 302 is being used does not become too bright. If the intensity of ambient illumination 310 that is detected increases above a threshold value, however, then the controller 314 may be configured to select the laser targeting source 326b.

In some embodiments, the controller 314 may be configured to adjust outputs of the barcode reader 302 based on a predetermined schedule 325. This may be done in parallel with adjusting the outputs based on the detected ambient illumination 310 and the detected ambient noise 320. Under some circumstances, the controller 314 may be configured to adjust outputs of the barcode reader 302 based on the schedule 325 unless the current levels of ambient illumination 310 and/or ambient noise 320 suggest that the schedule 325 should not be followed. For example, if the schedule 325 indicates that the brightness level of the indicator lights 306a-b should be relatively low and the intensity of ambient illumination 310 detected by the light detector 308 is relatively low, then the controller 314 may follow the schedule 325. However, if the schedule 325 indicates that the brightness level of the indicator lights 306a-b should be relatively low but the intensity of ambient illumination 310 detected by the light detector 308 is relatively high, then the controller 314 may ignore the schedule 325 and adjust the brightness level of the indicator lights 306a-b based on the intensity of ambient illumination 310 that is detected.

One advantage of the schedule 325 is that it could potentially allow the light detector 308 (and/or the sound detector 318) to detect the ambient illumination 310 (and/or the ambient noise 320) less frequently, thereby saving battery life. The schedule 325 may be constructed based on known patterns of use of the barcode reader 302. In some embodiments, the schedule 325 may be constructed using machine learning techniques. Data including previously detected levels of ambient illumination 310 and/or ambient noise 320 as well as the corresponding timestamps may be analyzed for patterns, and the schedule 325 may be constructed based on those patterns.

Figure 4:
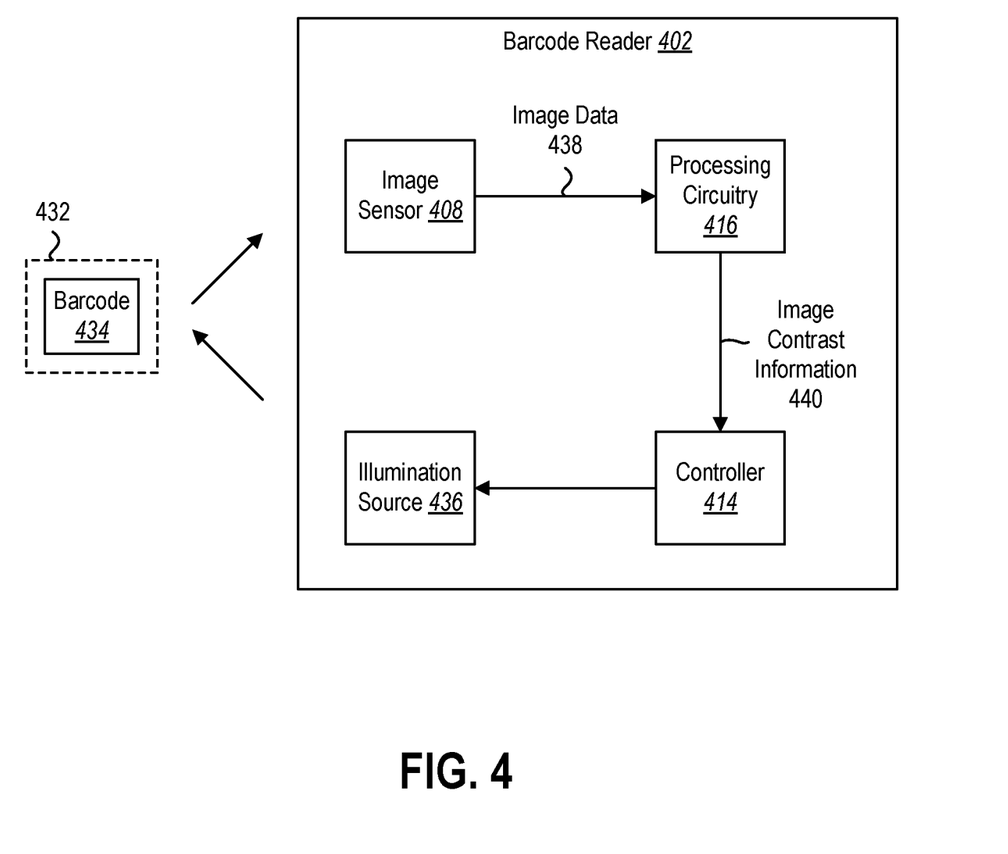
FIG. 4 illustrates an example of a barcode reader that is configured to adjust the color of illumination that is emitted by an illumination source based on a characteristic of a barcode within the field of view of the barcode reader.

FIG. 4 illustrates another example of a barcode reader 402 that is configured to adjust one or more of its outputs based on one or more ambient characteristics in accordance with the present disclosure. In the depicted embodiment, the output that is adjusted is the color of illumination that is emitted by an illumination source 436, and the ambient characteristic includes a characteristic (e.g., the color) of a barcode 434 within the field of view of the barcode reader 402.

The barcode reader 402 includes an image sensor 408 that is configured to capture an image of a target area 432, which may include a barcode 434. The barcode reader 402 also includes an illumination source 436, which is configured to emit illumination onto the target area 432.

The barcode reader 402 also includes a controller 414 that is configured to adjust the color of illumination that is emitted by the illumination source 436 based on a characteristic of the barcode 434, such as the color of the barcode 434. For example, suppose that under normal circumstances the illumination source 436 is configured to emit red illumination. If, however, the barcode 434 itself is the color red, then the controller 414 may change the color of illumination that is emitted by the illumination source 436 from red to another color (e.g., white). As another example, the controller 414 may change the color of illumination that is emitted by the illumination source 436 upon detecting that the barcode 434 is a particular type of barcode, such as a direct part marking (DPM) barcode.

In order to determine whether the color of illumination that is emitted by the illumination source 436 should be adjusted, the controller 414 may use information 440 about the contrast of the images that are captured by the image sensor 408. This image contrast information 440 may be determined by processing circuitry 416 that analyzes image data 438 from the image sensor 408. If the image contrast information 440 indicates that the image contrast has decreased below a threshold level, then the controller 414 may adjust the color of illumination that is emitted by the illumination source 436.

The term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode-reading system, comprising:
  a barcode reader;
  an image sensor configured to capture an image within a field of view of the barcode reader; and
  a controller configured to:
    detect a color of a barcode in the image; and
    automatically adjust, based on the color of the barcode, a color of illumination emitted by an illumination source of the barcode reader.

2. The barcode-reading system of claim 1, wherein the controller is configured to automatically adjust, in response to detecting the color of the barcode, the color of illumination emitted by the illumination source of the barcode reader to be different from the color of the barcode.

3. The barcode-reading system of claim 1, wherein the controller is additionally configured to:
  detect a type of the barcode in the image; and
  automatically adjust the color of illumination emitted by the illumination source of the barcode reader based on the type of the barcode.

4. The barcode-reading system of claim 3, wherein:
  the barcode reader further comprises processing circuitry configured to determine contrast information of the image; and
  the controller is additionally configured to automatically adjust the color of illumination emitted by the illumination source of the barcode reader based on the contrast information.

5. The barcode-reading system of claim 4, wherein the controller is configured to automatically adjust the color of illumination emitted by the illumination source of the barcode reader when the contrast information indicates that an image contrast of the image is below a threshold level.

6. The barcode-reading system of claim 1, wherein:
  the barcode reader further comprises processing circuitry configured to determine contrast information of the image; and
  the controller is additionally configured to automatically adjust the color of illumination emitted by the illumination source of the barcode reader based on the contrast information.

7. The barcode-reading system of claim 6, wherein the controller is configured to automatically adjust the color of illumination emitted by the illumination source of the barcode reader when the contrast information indicates that an image contrast of the image is below a threshold level.

8. A barcode-reading system, comprising:
a barcode reader;
an image sensor configured to capture an image within a field of view of the barcode reader; and
a controller configured to:
detect a type of a barcode in the image; and
automatically adjust, based on the type of the barcode, a color of illumination emitted by an illumination source of the barcode reader.

9. The barcode-reading system of claim 8, wherein the controller is additionally configured to:
detect a color of the barcode in the image; and
automatically adjust the color of illumination emitted by the illumination source of the barcode reader based on the color of the barcode.

10. The barcode-reading system of claim 9, wherein the controller is configured to automatically adjust the color of illumination emitted by the illumination source of the barcode reader to be different from the color of the barcode.

11. The barcode-reading system of claim 9, wherein:
the barcode reader further comprises processing circuitry configured to determine contrast information of the image; and
the controller is additionally configured to automatically adjust the color of illumination emitted by the illumination source of the barcode reader based on the contrast information.

12. The barcode-reading system of claim 11, wherein the controller is configured to automatically adjust the color of illumination emitted by the illumination source of the barcode reader when the contrast information indicates that an image contrast of the image is below a threshold level.

13. The barcode-reading system of claim 8, wherein:
the barcode reader further comprises processing circuitry configured to determine contrast information of the image; and
the controller is additionally configured to automatically adjust the color of illumination emitted by the illumination source of the barcode reader based on the contrast information.

14. The barcode-reading system of claim 13, wherein the controller is configured to automatically adjust the color of illumination emitted by the illumination source of the barcode reader when the contrast information indicates that an image contrast of the image is below a threshold level.

15. A barcode-reading system, comprising:
a barcode reader;
an image sensor configured to capture an image within a field of view of the barcode reader; and
a controller configured to:
determine contrast information related to the image; and
automatically adjust, based on the contrast information, a color of illumination emitted by an illumination source of the barcode reader.

16. The barcode-reading system of claim 15, wherein the controller is additionally configured to:
detect at least one characteristic of a barcode in the image; and
automatically adjust the color of illumination emitted by the illumination source of the barcode reader based on the at least one characteristic of the barcode.

17. The barcode-reading system of claim 16, wherein the at least one characteristic of the barcode comprises a color of the barcode.

18. The barcode-reading system of claim 17, wherein the controller is configured to automatically adjust the color of illumination emitted by the illumination source of the barcode reader to be different from the color of the barcode.

19. The barcode-reading system of claim 16, wherein the at least one characteristic of the barcode comprises a type of the barcode.

20. The barcode-reading system of claim 16, wherein the at least one characteristic of the barcode comprises a color of the barcode and a type of the barcode.

* * * * *